United States Patent Office 2,865,861
Patented Dec. 23, 1958

2,865,861
HALOGENATED-3-PHENYLSALICYLANILIDES

John A. Stephens, St. Louis, Mo., assignor to Monsanto Chemical Company, St. Louis, Mo., a corporation of Delaware No Drawing. Application September 13, 1954
Serial No. 455,767

5 Claims. (Cl. 252—107)

This invention relates to halogenated-3-phenylsalicylanilides and to the process for making same.

The new compounds of this invention exhibit fungicidal and bactericidal properties and may be represented by the general formula

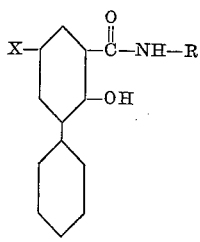

where X is a halogen atom, e. g. chlorine, bromine, iodine and fluorine, and where R is a benzenoid hydrocarbon radical such as phenyl, tolyl, ethylphenyl, cumyl, tert. butylphenyl, isoamylphenyl, hexylphenyl, xylyl, cymyl, biphenylyl, and the like, containing at least one halogen substituent. While R may be any mono-, di-, or polyhalogenated benzenoid hydrocarbon radical, it is preferred that R contain not more than three halogen substituents which may be like or unlike and which preferably are of the group consisting of chlorine and bromine. As illustrative of specific halogenated - 3 - phenylsalicylanilides contemplated but in no wise limited thereto are 2′,5-dichloro-3-phenylsalicylanilide
3′,5-dichloro-3-phenylsalicylanilide
3′,5-dichloro-4′-methyl-3-phenylsalicylanilide
3′,5-dichloro-4′-isoamyl-3-phenylsalicylanilide
3′,5-dichloro-4′-phenyl-3-phenylsalicylanilide
3′,5-dibromo-3-phenylsalicylanilide
3′-bromo-5-chloro-3-phenylsalicylanilide
4′-5-dichloro-3-phenylsalicylanilide
4′,5-dichloro-2′-methyl-3-phenylsalicylanilide
4′-5-dichloro-3′-methyl-3-phenylsalicylanilide
4′,5-dibromo-3-phenylsalicylanilide
5-bromo-4′-chloro-3-phenylsalicylanilide
3′,4′,5-trichloro-3-phenylsalicylanilide
2′,4′,5-trichloro-3-phenylsalicylanilide
3′,4′,5′,5-tetrachloro-3-phenylsalicylanilide
5-bromo-3′,4′,5′-trichloro-3-phenylsalicylanilide The new compounds may be prepared by condensing in the presence or absence of an inert solvent a primary amine of the formula $RNH_2$ wherein R has the significance aforementioned with an ester of 5-halo-3-phenylsalicylic acid such as the phenyl ester at the reflux temperature of the system.

As illustrative of the preparation of the new compounds is the following:

EXAMPLE A

*5-chloro-3-phenylsalicylic acid*

In a suitable reaction vessel containing approximately 71 parts by weight of 3-phenylsalicylic acid suspended in approximately 315 parts by weight of glacial acetic acid is passed below the surface gaseous chlorine until the reaction is no longer exothermic. Approximately 39 parts by weight of chlorine are absorbed in this manner. The slurry so obtained is cooled and filtered. The residue is washed with water and dried. The yield of 5-chloro-3-phenylsalicylic acid is about 49.5 parts by weight.

EXAMPLE B

*Phenyl 5-chloro-3-phenylsalicylate*

In a suitable reaction vessel approximately 35 parts by weight of 5-chloro-3-phenylsalicylic acid, approximately 14.6 parts by weight of phenol and approximately 21 parts by weight dioxan are intimately mixed and heated to about 70° C. Thereupon approximately 8 parts by weight of phosphorus oxychloride is added over a period of about 15 minutes and the mixture heated to about 116° C. The mix is then agitated at about 116–125° C. until hydrogen chloride no longer evolves (about 5.7 hours). The mix is then poured into a mixture of ice and water with vigorous agitation. A white gum-like material separates which solidifies on standing. The solid is collected, washed with water and dried under reduced pressure. The yield of phenyl 5-chloro-3-phenylsalicylate is about 39.5 parts by weight.

EXAMPLE I

Approximately 9.4 parts by weight of p-chloroaniline, approximately 19.0 parts by weight of phenyl 5-chloro-3-phenylsalicylate and approximately 15 parts by weight of 1,2,4-trichlorobenzene are intimately mixed and heated at 210–245° C. over a period of 5–6 hours while distilling forward a mixture of phenol and 1,2,4-trichlorobenzene. The residue is then cooled and allowed to stand overnight. The solidified mass is then washed with dilute hydrochloric acid then with water and dried. Upon recrystallization from benzene, followed by recrystallization from aqueous ethanol 4′,5-dichloro-3-phenylsalicylanilide (M. P. 149.1–150.2° C.) is obtained as white coarse needles.

EXAMPLE II

Employing the process of Example I but replacing p-chloroaniline with a chemically equivalent amount of m-chloroaniline there is obtained 3′,5-dichloro-3-phenylsalicylanilide.

EXAMPLE III

Approximately 12.5 parts by weight of 2,4-dichloroaniline, approximately 20 parts by weight of phenyl 5-chloro-3-phenylsalicylate and approximately 18 parts by weight of 1,2,4-trichlorobenzene are intimately mixed and heated at 210–245° C. over a period of 5–6 hours while distilling forward a mixture of phenol and 1,2,4-trichlorobenzene. The residue is then cooled and allowed to stand overnight. The solidified mass is then taken up with a mixture of benzene and n-heptane and crystallized therefrom. The mass so obtained is then recrystallized from aqueous ethanol. The fine white needle-like product so obtained melts at 145.9–146.5° C. and is identified as 2′,4′,5-trichloro-3-phenylsalicylanilide.

EXAMPLE IV

Employing the process of Example III but replacing 2,4-dichloroaniline with a chemically equivalent amount of 3,4-dichloroaniline there is obtained 3′,4′,5-trichloro-3-phenylsalicylanilide.

EXAMPLE V

Employing the process of Example III but replacing 2,4-dichloroaniline with a chemically equivalent amount of 3,4,5-trichloroaniline there is obtained 3′,4′,5′,5-tetrachloro-3-phenylsalicylanilide.

In the preparation of the new compounds other inert organic solvents may be employed than the aforedescribed, as for example diphenyl ether, bicyclohexyl, phenylcyclohexyl, biphenyl, and the like. When a phenyl ester of 5-halo-3-phenylsalicylic acid is employed in preparing the new compounds, it is preferred that an inert solvent be employed which is characterized by a boiling point in excess of 200° C. and that the reaction be carried out at the reflux temperature of the system while removing the inert solvent and the phenol by-product.

The compounds of this invention, i. e. those of the general formula

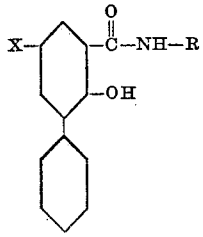

where X is chlorine and where R is a chlorinated benzenoid hydrocarbon have been found to have outstanding antiseptic properties in detergent soap formulations. As illustrative of such several members of the group were incorporated in an "Ivory" brand neutral high grade white toilet soap (a mixture of 80% sodium soap and 20% potassium soap produced from a 70% tallow and 30% coconut oil blend in accordance with U. S. 2,295,594 in a weight ratio of one part to 50 parts by weight soap. Aliquots of each were added to Sabourard's dextrose agar medium so as to give concentrations of 10 and 1 part per million in the agar. The agar in each case was then poured into a petri dish, allowed to harden and then inoculated with a standard culture of *Micrococcus pyogenes* var. *aureus* of standard resistance. The incubation in each case was made simultaneously at 37° C. for 48 hours. The extent of growth is noted below.

TABLE

| Concentration, p. p. m. | 10 | 1 |
|---|---|---|
| 4′,5-dichloro-3-phenylsalicylanilide | none | none |
| 2′,4′,5-trichloro-3-phenylsalicylanilide | none | none |

Others of this class operable as soap antiseptic agents comprise 3′,5 - dichloro - 3 - phenylsalicylanilide, 3′,4′,5-trichloro - 3 - phenylsalicylanilide, 3′,4′,5′,5 - tetrachloro-3 - phenylsalicylanilide, 3′,5′,5 - trichloro - 3 - phenylsalicylanilide, 4′,5 - dichloro - 2′ - methyl - 3 - phenylsalicylanilide and 3′,5 - dichloro - 4′ - methyl - 3- phenylsalicylanilide.

Relatively small amounts of these chlorinated 5-chloro-3-phenylsalicylanilides in a detergent soap composition have been found to yield effective antiseptic detergent soap compositions. Amounts as low as 0.5 to 1% by weight based upon the weight of the detergent soap have proved satisfactory in some instances. However, it is preferred to employ these chlorinated 5-chloro-3-phenylsalicylanilides in amounts in the order of 1 to 3% by weight based on the detergent soap. While larger amounts may be employed, as for example up to 10% by weight the upper limit will be determined by practical considerations. Various colors, antioxidants, perfumes, water softeners, emollients and the like may be included where desirable in detergent soap compositions containing the new chlorinated 5-chloro-3-phenylsalicylanilides. The term "soap" or "detergent soap" as used herein is employed in its popular or ordinary sense, i. e. those cleansing compositions prepared from an alkali metal compound such as potassium or sodium hydroxide and a fat or fatty acid, but saturated and unsaturated.

While this invention has been described with respect to certain embodiments it is not limited therein and it is to be understood that variations and modifications thereof may be made which are obvious to those skilled in the art without departing from the spirit or scope of the invention.

What is claimed is:

1. An antiseptic detergent soap composition comprising a detergent soap and 0.1% to 10% by weight based upon the soap of a compound of the structure

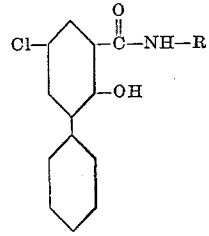

where R is a benzenoid hydrocarbon radical containing 1 to 3 chlorine substituents which chlorine substituents are directly attached to the aromatic ring nucleus of the said benzenoid hydrocarbon radical.

2. An antiseptic detergent soap composition comprising a detergent soap and 1% to 3% by weight based upon the soap of a compound of the structure

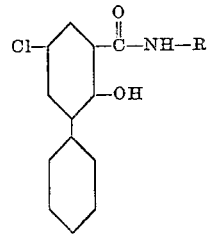

where R is the dichlorophenyl radical $C_6H_3Cl_2$.

3. An antiseptic detergent soap composition comprising a detergent soap and 1% to 3% by weight based upon the soap of a compound of the structure

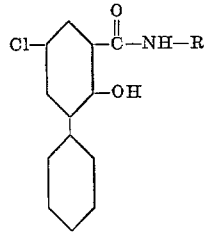

where R is the monochlorphenyl radical $C_6H_4Cl$.

4. An antiseptic detergent soap composition comprising a detergent soap and 1% to 3% by weight based on the soap of 2′,4′,5-trichloro-3-phenylsalicylanilide.

5. An antiseptic detergent soap composition comprising a detergent soap and 1% to 3% by weight based on the soap of 4′,5-dichloro-3-phenylsalicylanilide.

References Cited in the file of this patent

UNITED STATES PATENTS

| 2,025,587 | Haller et al. | Dec. 24, 1935 |
| 2,059,195 | Anderson | Nov. 3, 1936 |
| 2,376,743 | Wendt | May 22, 1945 |
| 2,703,332 | Bindler et al. | Mar. 1, 1955 |
| 2,773,096 | Sahyun et al. | Dec. 4, 1956 |

FOREIGN PATENTS

| 1,066,216 | France | Jan. 20, 1954 |

OTHER REFERENCES

Vorozhtsov et al.: "J. Gen. Chem." (USSR), vol. 8 (1938), pp. 424–430.

Hirwe et al.: "J. Ind. Chem. Soc.," vol. 16 (1939, pp. 281–284.

Van Allan: "Org. Synthesis," vol. 26 (1946), pp. 92 to 94.

Van Allan: "J. Am. Chem. Soc.," vol. 69 (1947), pp. 2913–2914.